Sept. 15, 1925.  R. E. TYVAND  1,554,143
EGG GRADER
Filed July 8, 1924
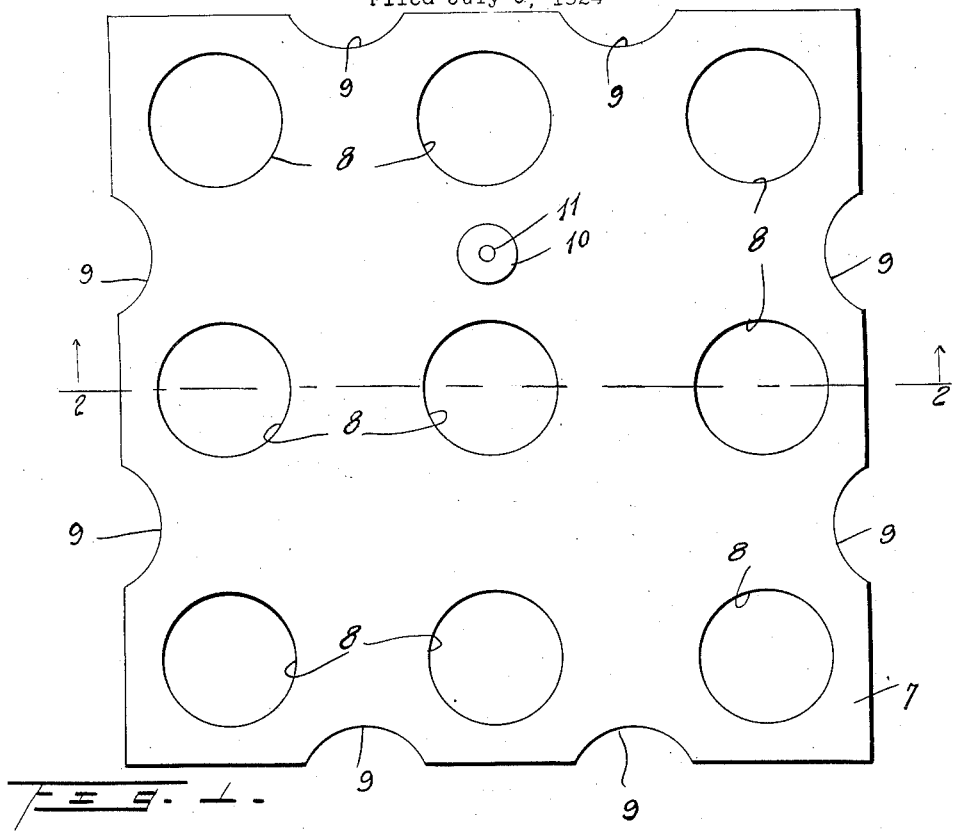
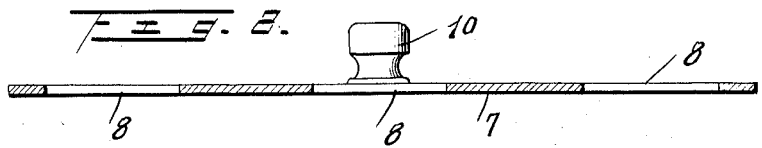
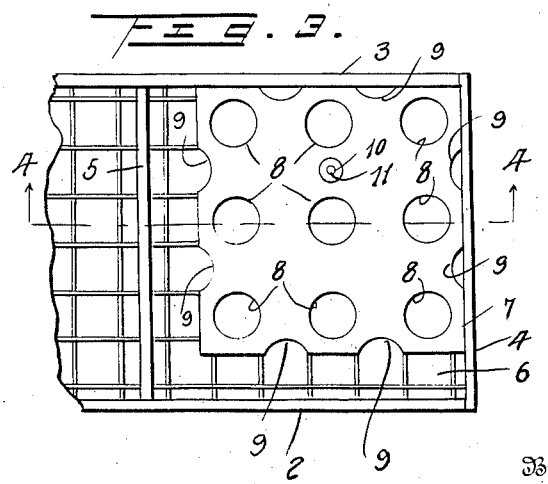
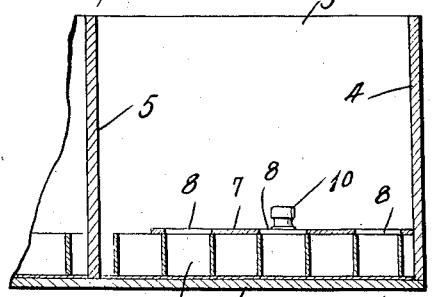
Inventor
R. E. Tyvand.

Patented Sept. 15, 1925.

1,554,143

UNITED STATES PATENT OFFICE.

RAYMOND E. TYVAND, OF BARTON, NORTH DAKOTA.

EGG GRADER.

Application filed July 8, 1924. Serial No. 724,820.

*To all whom it may concern:*

Be it known that I, RAYMOND E. TYVAND, a citizen of the United States, residing at Barton, in the county of Pierce and State of North Dakota, have invented certain new and useful Improvements in Egg Graders; and I do hereby declare the following to be a full, clear, and exact description of the invention, such as will enable others skilled in the art to which it appertains to make and use the same.

This invention relates to egg graders, and has for its primary object to improve and simplify devices of this character and to provide one through the medium of which eggs may be readily graded as to size and at the same time deposited in the cells of the fillers of an egg crate.

With the above and other objects in view, the invention consists in the construction hereinafter fully described and claimed, and illustrated in the accompanying drawing, wherein:

Figure 1 is a top plan view of an egg grader constructed in accordance with my invention, Figure 2 is a sectional view taken on the plane indicated by the line 2—2 of Figure 1, Figure 3 is a top plan view of a fragmentary portion of an egg crate with the egg grader in position therein for use, and Figure 4 is a sectional view taken on the plane indicated by the line 4—4 of Figure 3.

Referring to the drawing by reference numerals, 1 designates the bottom wall, 2 the front wall, 3 the rear wall, 4 an end wall, 5 the partition, and 6 the fillers of an egg crate of the usual form and construction.

The grader comprises a plate 7 which may be made of fiber board, hard rubber, celluloid, sheet metal or any other suitable material. The plate 7 is rectangular, and it is provided with relatively spaced rows of openings 8. Preferably, the plate 7 is provided with three rows of openings, and each row preferably consists of three openings. The openings 8 are preferably circular, and are of a size to permit the passage therethrough of those eggs only which due to their small size are classed as seconds. The rows of openings 8 and the openings of the respective rows are spaced apart for a distance approximately equal to the horizontal dimensions of a cell of the fillers 6. The horizontal dimensions of the plate 7 are greater than the combined similar dimensions of five rows of the cells of the fillers 6, and it is provided in its edges between each pair of the openings 8 with arcuate notches 9. A handle 10 is secured to the plate 7 by means of a rivet 11 or other similar attaching element.

In practice, the plate 7 is placed upon one of the fillers 6 of the egg crate with one of its corners in contact with one of the corners of the compartment of the egg crate in which the filler is located. When the plate is thus positioned within the egg crate, its openings 8 will, due to the distance that the openings are spaced apart and to the horizontal dimensions of the plate, register with certain of the cells of the fillers 6. The eggs are then placed upon the plate 7, and the small ones or those that are considered seconds will pass through the openings 8 into those cells of the filler with which the openings register. The plate 7 is then moved on the filler 6 until another of its corners contacts with another corner of the egg crate, with the result that the openings 8 are brought into registration with certain other cells of the filler. After these cells have been filled, the plate 7 is again moved on the filler 6 until another of its corners contacts with another corner of the egg crate, and after the cells of the fillers 6 with which the openings 8 now register are filled, the plate 7 is again moved on the filler until its fourth corner contacts with the fourth corner of the egg crate. After the cells of the filler 6 with which the openings 8 now register are filled, all the cells of the filler contain eggs which are classed as seconds. The handle 10 permits the plate to be readily applied and removed and moved from one corner to another of the egg crate. When the plate 7 is in any one of the positions stated, certain of the notches 9 register with certain of the cells of the filler, and due thereto eggs, which are too large to pass through the openings 8 but which, due to their soiled condition or irregular formation, are classed as seconds may be placed in certain cells of the filler.

Due to the distance that the openings are spaced apart, the plate 7 may be made of very thin material. Owing thereto, and as the openings may be readily punched in the plate and the handle readily secured to the plate, it should be apparent that the egg grader may be manufactured and sold at a comparatively low cost. It should also be apparent that the egg grader is of simple construction and provides means through the medium of which eggs may be readily graded as to size and at the same time deposited in the cells of the fillers of an egg crate.

What is claimed is:—

In combination, an egg crate, a filler therein, a rectangular grader plate smaller than the filler and adapted to be moved with respect thereto to successively position its respective corners in contact with the respective corners of the crate, said plate being provided with openings adapted to register with certain cells of the filler in each position of the plate to permit eggs of a certain grade to be placed in such cells, and said plate having notches in the sides thereof, the notches of the respective sides of the plate being adapted to register with certain other cells of the filler in the respective positions of the plate to permit eggs of a different grade to be placed in such other cells.

In testimony whereof I affix my signature.

RAYMOND E. TYVAND.